(12) United States Patent
Shinada

(10) Patent No.: US 6,680,670 B2
(45) Date of Patent: Jan. 20, 2004

(54) ON-VEHICLE ELECTRONIC APPARATUS AND INFORMATION NOTIFICATION METHOD

(75) Inventor: Akira Shinada, Tokyo (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 09/841,640

(22) Filed: Apr. 24, 2001

(65) Prior Publication Data

US 2001/0033235 A1 Oct. 25, 2001

(30) Foreign Application Priority Data

Apr. 25, 2000 (JP) .......................................... 2000-124210

(51) Int. Cl.$^7$ ................................................. B60Q 1/00
(52) U.S. Cl. ........................................ 340/439; 340/576
(58) Field of Search .............................. 340/905, 995, 340/439, 438, 575, 576, 995.1

(56) References Cited

U.S. PATENT DOCUMENTS

| | | | | |
|---|---|---|---|---|
| 5,270,708 A | * | 12/1993 | Kamishima | 340/995 |
| 5,315,295 A | * | 5/1994 | Fujii | 340/936 |
| 5,521,580 A | * | 5/1996 | Kaneko et al. | 340/439 |
| 5,568,390 A | * | 10/1996 | Hirota et al. | 340/995 |
| 5,574,641 A | * | 11/1996 | Kawakami et al. | 340/575 |
| 5,642,093 A | * | 6/1997 | Kinoshita et al. | 340/439 |
| 5,821,860 A | * | 10/1998 | Yokoyama et al. | 340/576 |
| 5,952,929 A | * | 9/1999 | Yasushi et al. | 340/575 |
| 6,014,081 A | * | 1/2000 | Kojima et al. | 340/576 |

\* cited by examiner

*Primary Examiner*—Brent A. Swarthout
(74) *Attorney, Agent, or Firm*—Jay H. Maioli

(57) ABSTRACT

This invention provides an on-vehicle electronic apparatus for making an automobile reach its destination in a relatively short time and preventing its driver from getting bored. A central processing unit statistically determines positional information obtained from the map information read from a mass storage unit and the information obtained from a GPS antenna for example and notifies the driver of the resultant information through a speaker or a image display unit. The novel constitution can change the planned routes to a destination and the timings of navigation to a planned route.

8 Claims, 3 Drawing Sheets

F I G. 2
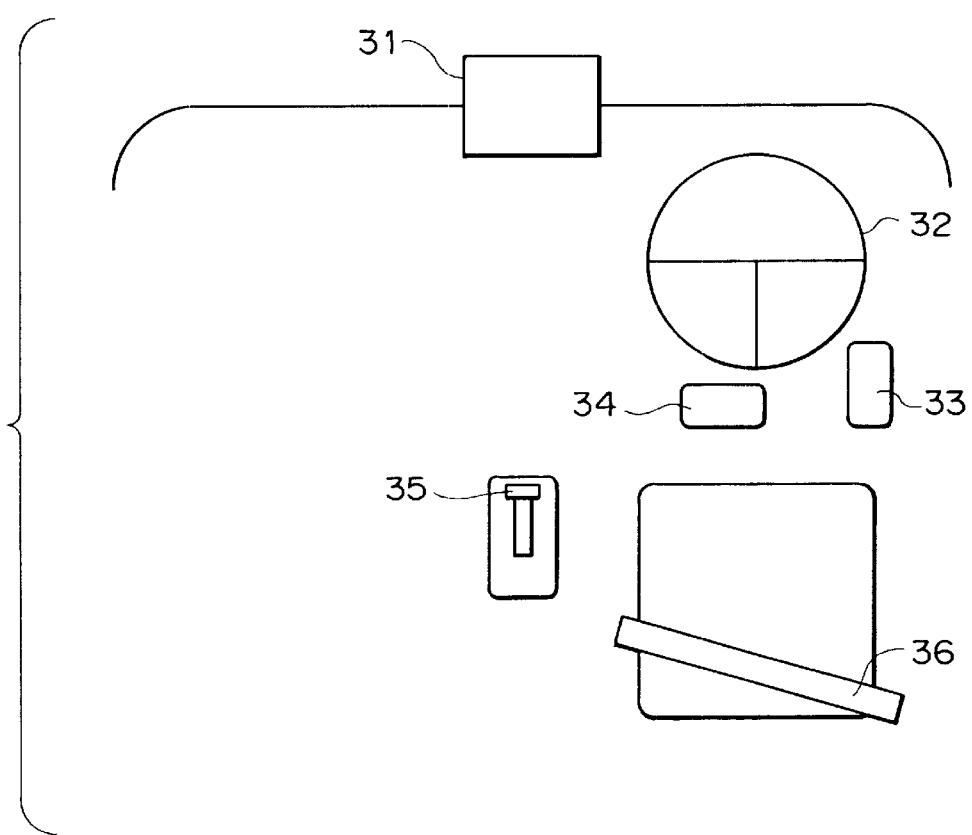

ON-VEHICLE ELECTRONIC APPARATUS AND INFORMATION NOTIFICATION METHOD

BACKGROUND OF THE INVENTION

The present invention relates generally to an on-vehicle electronic apparatus and an information notification method for use on a vehicle for providing its driver with various information and amusements.

Today, many automobiles are equipped with various on-vehicle electronic devices such as navigators, sound players, and video players. These devices navigate an automobile to a desired destination by displaying the planned route and current position for example of the automobile and reproduce music and video for the entertainment of the driver and other occupants.

However, the above-mentioned on-vehicle electronic devices are passive in operation, or they operate only in accordance with the instructions given by the driver. These conventional electronic devices are unable to navigate automobiles with flexibility in accordance with their driving states and traffic congestion conditions for example and unable to provide the driver with mental comforts in response to their physical conditions, thereby sometimes making the driver get bored.

SUMMARY OF THE INVENTION

It is therefore an object of the present invention to provide an on-vehicle electronic apparatus and an information notification method for flexibly changing planned routes to a destination in accordance with automobile's driving states and traffic congestion conditions for example and timely providing the driver with mental comforts in according with their physical conditions, thereby preventing the driver from getting bored.

To achieve the above object, according to a first aspect of the present invention, there is provided an on-vehicle electronic apparatus including driving state detection means for detecting a driving state of an automobile, positional information collection means for collecting positional information about the automobile, decision means for statistically deciding information supplied from the driving state detecting means and the positional information collecting means, and notification means for notifying a driver of the automobile of the statistically decided information.

According to a second aspect of the present invention, there is provided an information notification method including the steps of detecting a driving state of an automobile, collecting positional information about the automobile, deciding information supplied from the driving state detecting means and the positional information collecting means, and notifying a driver of the automobile of the statistically decided information.

BRIEF DESCRIPTION OF THE DRAWINGS

These and other objects of the invention will be seen by reference to the description, taken in connection with the accompanying drawing, in which:

FIG. 2 is a schematic diagram illustrating the proximity of the driver's seat of an automobile to which the above-mentioned embodiment is applied.

DETAILED DESCRIPTION OF PREFERRED EMBODIMENT

This invention will be described in further detail by way of example with reference to the accompanying drawings.

Figure 1:
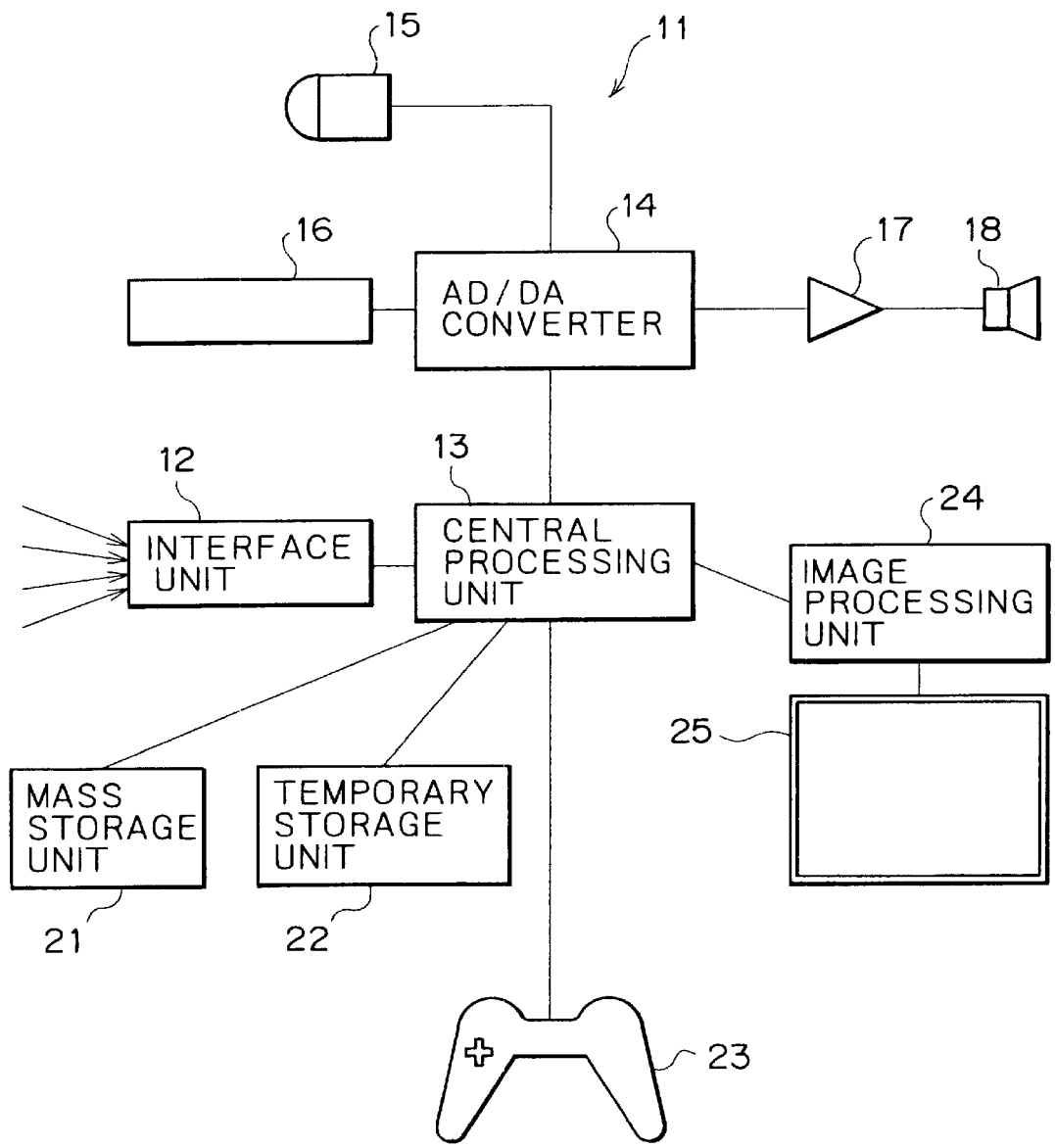
FIG. 1 is a block diagram illustrating one preferred embodiment of the present invention.

Now, referring to FIG. 1, there is shown an on-vehicle electronic apparatus 11 practiced as one preferred embodiment of the invention. This on-vehicle electronic apparatus 11 has an interface unit 12 through which the on-vehicle electronic apparatus 11 captures various information to be described below. The interface unit 12 is connected to a central processing unit 13. The central processing unit 13 is connected to an AD/DA converter 14. The AD/DA converter 14 is connected to a microphone 15 for picking up voice and a read-only storage unit 16, which is a DVD (Digital Versatile Disc) driver for example.

From the read-only storage unit 16, programs and voice information for example are read. The AD/DA converter 14 is also connected to an amplifier 17, which is connected to a speaker 18. The central processing unit 13 is connected to a mass storage unit 21, which is a hard disk drive for example, a temporary storage unit 22, which is a semiconductor storage unit for example, and an operator device 23. The mass storage unit 21 stores map information, voice information, and past logs about the automobile and its driver for example.

The central processing unit 13 is also connected to an image processing unit 24 to which an image display unit 25 is connected. the central processing unit 13 is also connected to a GPS (Global Positioning System) antenna (not shown) for navigation and a detecting unit (not shown) for detecting driver's physical conditions such as body build, posture, temperature, pulsation, and blood pressure. Further, the central processing unit 13 is connected to such units (not shown) for collecting information from outside the automobile as a traffic information receiver of FM multiplex telecasting, a VICS (Vehicle Information and Communication System) information receiver, and a communications unit based on the Internet.

Referring to FIG. 2, there is shown the proximity of the driver's seat of an automobile. The automobile's travel speed and distance are obtained from a speedometer and a distance meter arranged on an instrument panel 31. A steering operation of a steering wheel 32 and the speed at which the automobile changes its travel direction are obtained from the movements of a steering wheel 32. An accelerator opening is obtained from the stepping-on of an accelerator pedal 33 and a braking timing from the stepping-on of a brake pedal 34.

In addition, a gear shifting timing in forward travel and a backward travel frequency are obtained from the operation on a gearshift lever 35 and a seatbelt fastening timing is obtained from the operation on a seatbelt 36. These and other items of information are inputted in the central processing unit 13 via the interface unit 12. On many of today's automobiles, these items of information can be obtained with ease. For example, the controlling of the actions of air bag and seatbelt and the preventing of the driver from dozing have already been realized.

In the on-vehicle electronic apparatus 11, the central processing unit 13 combines these items of information and these items of information with the past log read from the mass storage unit 21 and, on the basis of the resulting combinations, statistically detect such automobile's driving conditions as a time from opening the door to starting the automobile, a timing of fastening the seatbelt 36, the frequency of gear shifting, a timing of stepping on the brake pedal 34 relative to stopping position, and the frequency of lane change.

In addition, the central processing unit 13 detects information such as whether the automobile is in deceleration enough for the driver to steer the steering wheel 32, how the driver's posture changes, how acceleration is made, when the automobile is driven more often, day or night, to which place the automobile is driven most often, and the information about such a place. Moreover, the central processing unit 13 detects such information as how places visited by the automobile have changed yearly, the relationship between automobile's interior temperature and temperature set by air conditioner, automobile's interior air condition which causes the driver to open the window, what kind of conversations are made inside the automobile, and whether the automobile is driven by one particular person more often by two or more persons and vice versa.

Figure 3:
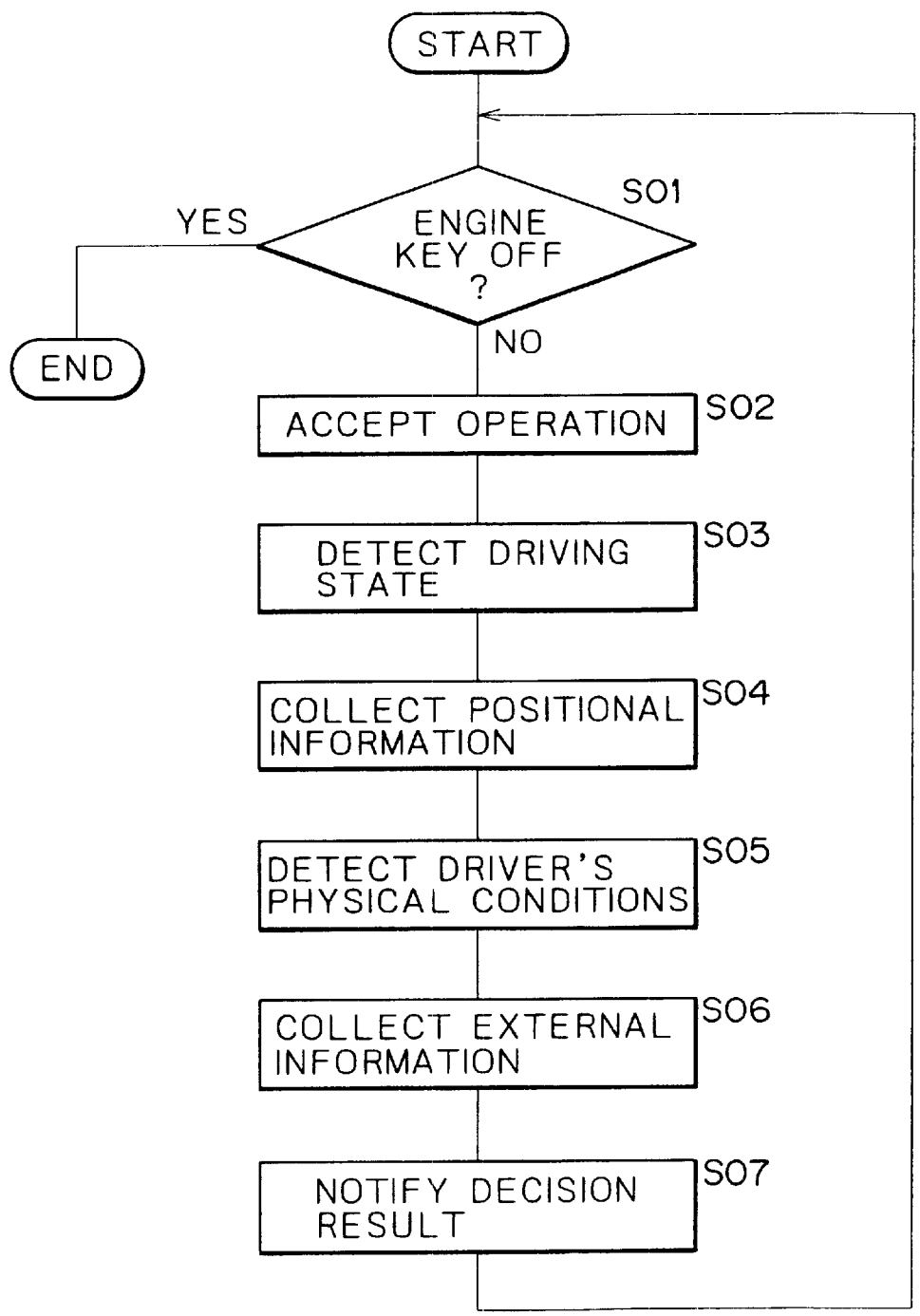
FIG. 3 is a flowchart describing the above-mentioned embodiment.

Referring to FIG. 3, there is shown a flowchart describing the processing to be executed by the on-vehicle electronic apparatus 11. If the engine key is not in off position (S01), the on-vehicle electronic apparatus accepts an operation made on the operator unit 23 or an operation by voice supplied from the microphone 15 (S02) In the case of the operation by voice, the central processing unit 13 recognizes the voice on the basis of the voice information read from the mass storage unit 21 and determines what operation has been made and, on the basis of the decision, reads a program and data necessary for executing the corresponding processing from the read-only storage unit 16 to the temporary storage unit 22.

Then, the central processing unit 13 detects the information about the automobile's driving states supplied from the interface unit 12 (S03), collects the positional information obtained on the basis of the map information stored in the mass storage unit 21 and the information supplied from the GPS antenna for example (S04), collects the information about the physical conditions of the driver supplied from a physical condition detecting unit (S05), and collects the external information such as traffic congestion conditions supplied from an internal information collecting unit (S06) From these collected items of information, the central processing unit 13 statistically determines the information that makes driving efficient and the driver comfortable. The determined information is transmitted to the driver through the amplifier 17, the speaker 18, the image processing unit 24, and the image display unit 25.

For example, assume that the automobile be being navigated along a planned route set by the navigator operated by the operator unit 23. If it is detected that the acceleration is higher than usual and automobile is not in enough deceleration for the steering wheel 32 to be steered, the central processing unit 13 determines that the driver is unusually hurrying to get to the destination. Then, the central processing unit 13 informs the driver of the detected situation through the speaker 18 and controls the automobile such that it can reach the destination in as short a time as possible by navigating along the shortest possible route and quickening the navigation timing for crossing intersections for example.

Conversely, if the driver is found not in a hurry, the central processing unit 13 navigates the automobile along the initially planned route. The changes of planned routes and timings of navigation to a planned route are also performed when the congestion information about the planned route is collected by the external information collection unit. Assume again that central processing unit 13 determine that the automobile does not usually decelerate enough for comfortably going around curves, the central processing unit 13 tells thereof through the speaker 18 when the automobile approaches every curve having more than a predetermined curvature.

If a generally straight road continues for relatively long and makes driving monotonous to make the driver feel dozy, the central processing unit 13 selects a piece of music having an awakening effect and sounds it from the speaker 18. If the driver is found, from his blood pressure for example, not in a calm state, then the central processing unit 13 selects a piece of music having a calming effect and sounds it from the speaker 18. These pieces of music make the driver mentally comfortable and, even if the driver is only occupant of the automobile, he can reach the destination without getting bored.

The above-mentioned processes are repeated until the engine key is turned off. However, the driver may not always want all of the above-mentioned information. In such a case, the driver can choose only the information he wants or no information at all.

As described and according to the invention, the on-vehicle electronic apparatus and the information notification method can flexibly change planned routes to a destination and timings of navigation to a planned route in accordance with an automobile's driving states, thereby making the automobile reach its destination in a shorter time.

As described and according to the invention, the on-vehicle electronic apparatus and the information notification method can mentally comfort the driver of an automobile in accordance with his physical conditions, thereby preventing the driver from getting bored in driving.

As described and according to the invention, the on-vehicle electronic apparatus and the information notification method can flexibly change planned routes to a destination and timings of navigation to a planned route in accordance with traffic congestion information, thereby making the automobile reach the destination in still a shorter time.

As described and according to the invention, the on-vehicle electronic apparatus and the information notification method allows the driver of an automobile to select functions and change operating states of the on-vehicle electronic apparatus, so that the driver can obtain only the desired information.

As described and according to the invention, the on-vehicle electronic apparatus and the information notification method notify the driver of an automobile of the information in voice and/or image, so that the driver can obtain desired information without being disturbed of his driving operation.

While the preferred embodiment of the present invention has been described using specific terms, such description is for illustrative purposes only, and it is to be understood that changes and variations may be made without departing from the spirit or scope of the appended claims.

What is claimed is:

1. An on-vehicle electronic apparatus comprising:
driving state detection means for detecting a driving state of an automobile;
physical condition detecting means for detecting physical conditions of a driver;
positional information collection means for collecting positional information about said automobile;
decision means for statistically deciding information output from said driving state detecting means and said positional information collecting means and said physical condition detecting means;
notification means for notifying said driver of said automobile of said statistically decided information output from said decision means; and control means for selecting a specific piece of music for playing by said notification means based on a particular detected physical condition of said driver.

2. The on-vehicle electronic apparatus according to claim 1, further comprising external information collection means for collecting information from outside said automobile, wherein said decision means further decides using information output from said external information collection means.

3. The on-vehicle electronic apparatus according to claim 1, further comprising operator means for controlling by said driver an operation state of said on-vehicle electronic apparatus.

4. The on-vehicle electronic apparatus according to claim 1, wherein said notification by said notification means is produced as one of voice and image.

5. The information notification method comprising the steps of:

detecting a driving state of an automobile;

collecting positional information about said automobile;

detecting physical conditions of a driver;

statistically deciding information output from said driving state detecting step, said positional information collecting step, and said physical conditions detecting step;

notifying said driver of said automobile of said statistically decided information output from said step of statistically deciding information; and selecting a specific piece of music for playing in said step of notifying based on a particular detected physical condition of said driver.

6. The information notification method according to claim 5, further comprising the step of collecting information from outside said automobile, wherein said decision step further decides using information output from said collecting information step.

7. The information notification method according to claim 5, further comprising the step of controlling by said driver an operation state of said on-vehicle electronic apparatus.

8. The information notification method according to claim 5, wherein said notification by said notification step is produced as one of voice and image.

* * * * *